March 5, 1935.   A. A. FREY   1,992,999

PROCESS OF MAKING IRON

Original Filed Feb. 5, 1927   2 Sheets-Sheet 1

WITNESSES:

INVENTOR
Albert A. Frey.
BY Howard Flint.
ATTORNEY

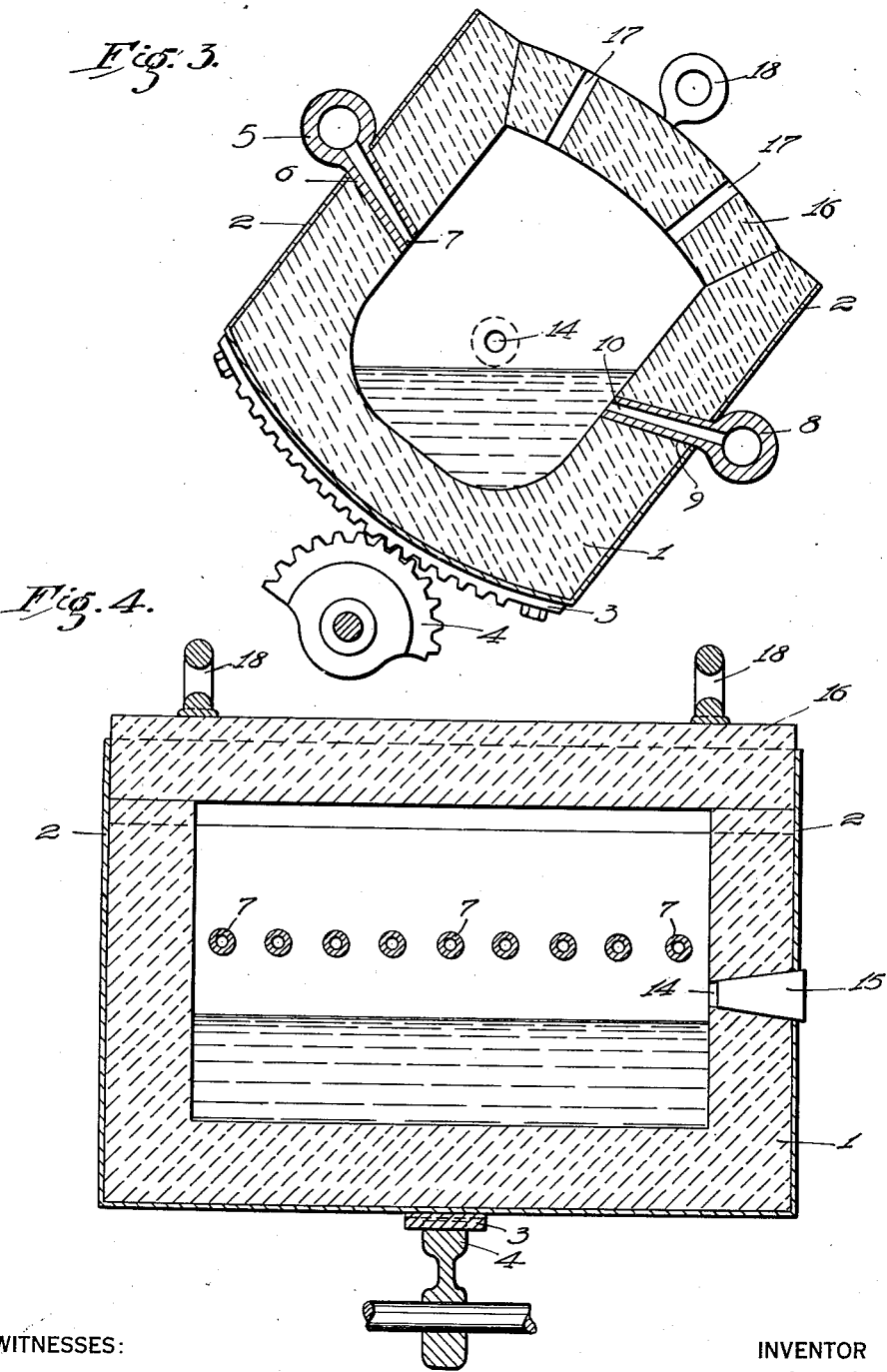

Patented Mar. 5, 1935

1,992,999

UNITED STATES PATENT OFFICE 1,992,999

PROCESS OF MAKING IRON

Albert A. Frey, Forest Hills, Pa.

Continuation of application Serial No. 166,117, February 5, 1927. This application January 23, 1932, Serial No. 588,409

14 Claims. (Cl. 75—44)

This case is a continuation of my copending application Serial Number 166,117, filed February 5, 1927.

My invention relates to metallurgy and specifically to the treatment and purification of iron.

It is among the objects of my invention to provide a process of making iron or steel, of an unusual degree of purity, either from the ordinary steel-making materials or from relatively pure raw materials.

Another object of my invention is to provide a process whereby the removal of impurities in the iron may be regulated with certainty and whereby iron of any desired quality may be produced.

For example, I first melt ferrous materials, such as pig iron, steel or scrap iron under strong basic conditions, such as with a lime-carbide slag, in a reducing atmosphere and in a basic-open-hearth or an electric furnace. Under these conditions, nearly all of the sulphur may be removed from the iron. The material remaining in the furnace is essentially a cast iron of low sulphur content containing preferably less than .01% sulphur.

When the sulphur content of the iron is sufficiently reduced, the slag is separated from the molten material. The treatment may be continued in the same basic furnace, but it is preferably carried on in another furnace of special design, wherein the molten material may be blown with gases. A basic oxidizing slag, preferably of lime and ferric oxide, is formed. If the treatment is continued in an open hearth, an oxidizing atmosphere is maintained in the furnace chamber by well-known methods, but, in order to shorten the process as much as possible and to prevent the absorption of sulphur from the lime, I prefer to blow the material with air in a furnace of special design.

The treatment of iron under oxidizing conditions by blowing oxidizing gas through the iron accomplishes oxidation of the carbon, silicon, manganese and phosphorus, removes the oxidized impurities, either as gases or as constituents of the slag, and tends to heat the iron, often heating it to an extremely high temperature. Whether the iron is blown with oxidizing gas or whether it is oxidized in an open hearth, the oxidation is continued until the carbon is considerably oxidized and there is a considerable excess of oxide of iron in the bath. The excess of oxygen in the bath will oxidize carbon and phosphorus in the iron after the bath has stood a short time and has had an opportunity to come to equilibrium.

The required degree of oxidation of the steel will vary according to the amount of oxidizable constituents to be removed and to the degree that the removal of other impurities is desired. If the steel contains a relatively large amount of carbon, manganese and phosphorus or if a high degree of purification is desired, a relatively long oxidizing treatment will be necessary. If less impurity is to be removed or more easily eliminated impurities are present, a shorter treatment and less oxidization of the iron will be required. In all instances, I introduce oxides into the steel as oxides of iron in quantities that are objectionable in high-grade steel, such as tool steel and magnetic steel.

The presence of an excess of oxide in the steel at this point in my process is not, however, objectionable, since the oxides tend, by secondary reactions, to oxidize and eliminate other impurities, particularly the carbon and phosphorus. The oxides in the steel at this point in the process are so high as to render the steel useless for most ordinary purposes.

By slightly delaying the process at this point, I utilize the purifying characteristics of the dissolved oxides and permit the highly heated-and liquid-molten iron to come to equilibrium, in order to give the metal an opportunity to expel small inclusions of slag and permit them to collect on the surface.

The foregoing step, which includes the oxidization of the metal and the subsequently described step, that of reducing the metal, is preferably carried out in a tilting furnace, so that the basic slag containing the oxidized silicon, phosphorus and manganese may be poured off after the oxidizing treatment.

In the present commercial steel-making processes, the oxides occurring in the steel are reduced by solid reagents, such as ferro-silicon, ferro-manganese or aluminum. The oxidation products, silica or alumina, resulting from such a treatment are molten or solid and consist of small particles of slag-like material dissolved or emulsified in the steel and distributed therethrough. Because of the fineness of the particles and their distribution throughout the body of the metal, it is impossible to effect a removal of them. My process consists in treating the metal with a gas and removing the oxides as self-eliminative gaseous bodies without forming metalloid bodies in the steel.

The choice of a suitable gaseous reducing agent depends upon the quality and nature of the steel which is to be produced as the final product. If it is essential to produce a carbon-free product, I blow the steel with hydrogen. Hydrogen is the most effective reducing agent for making an extremely pure product, since it reduces the oxides of iron, converts the combined oxygen into gaseous compounds which are self-eliminative, and it leaves no constituent of the gas in the product. At the same time, hydrogen operates to remove other impurities, such as sulphur, which may be present in the metal.

If a steel is desired in which a small amount of carbon may be tolerated, I may blow the metal with other reducing gases, such as carbon monoxide, methane, acetylene, or a mixture of hydrogen with one or more of such gases. A portion of the carbon contained in the gas will be absorbed and remain in the steel. The amount of carbon absorbed will depend on the nature of the gas and the duration of treatment with the gas. Treatment with a gas that is richer or leaner in carbon or a longer or shorter treatment with hydrocarbon gas will result in a greater or less absorption of carbon, as the case may be.

The treatment with hydrogen may, in some instances, result in cooling the metal. The cooling may be off-set by burning the hydrogen in the furnace for a time sufficient to supply the necessary heating.

If certain alloy steels are desired, the alloying metal may be added during or after the reducing step. For example, a silicon steel is formed by adding the necessary amount of ferro-silicon after the steel has been treated with the reducing gas.

My process may be more fully understood from a specific illustration, that of melting a charge of scrap steel of the following average composition in a basic hearth:

|   | Percent |
|---|---|
| C | .08— 1 |
| Mn | .25— .4 |
| S | .05 |
| P | .05 |
| Si | .25 |

A lime carbon slag is formed in the bath and the charge is heated under reducing conditions until the composition of the steel is approximately

|   | Percent |
|---|---|
| C | 3.5— 4 |
| Mn | .25— .4 |
| S | .005 or less |
| P | .05 |
| Si | .25 |

Melting under strongly reducing and strongly basic conditions thus removes sulphur.

I prefer to carry out the two subsequent steps of the process in a furnace of special design, as illustrated in the accompanying drawings, in which Fig. 1 is a view in cross-section of my furnace, tilted to one side;

Fig. 3 is a view of the furnace in a tilted position opposite to that shown in Fig. 1; and Fig. 4 is a view of the furnace, in cross-section, taken along the line IV—IV of Fig. 2.

Figure 1:
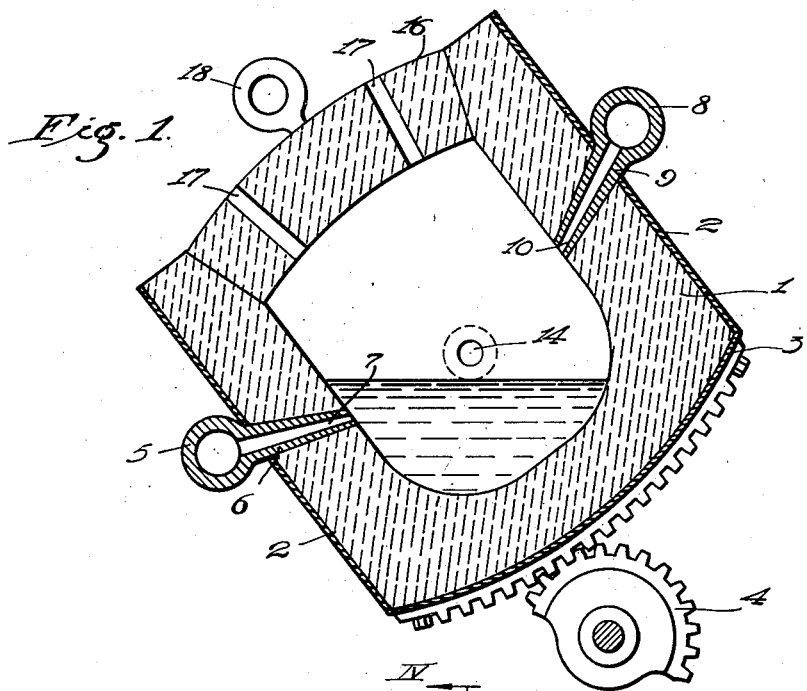

The furnace comprises a hearth 1 of basic material, such as magnesia. The hearth is contain in and held together by appropriate stays or a container 2. The furnace is of the rocking type and may be mounted on rockers 3 and provided with a driving pinion 4. A gas pipe 5 is mounted on one side of the furnace and is provided with a plurality of off-takes 6 that pass through the furnace wall 2 and terminate in nozzles 7, which are submerged in the metal when the furnace is in the position shown in Fig. 1.

Another gas pipe 8 is mounted on the opposite wall of the furnace and is provided with off-takes 9 that pass through the furnace wall and terminate in nozzles 10, through which a reducing gas may be introduced into the charge when the furnace is tilted in the position shown in Fig. 3.

Figure 2:
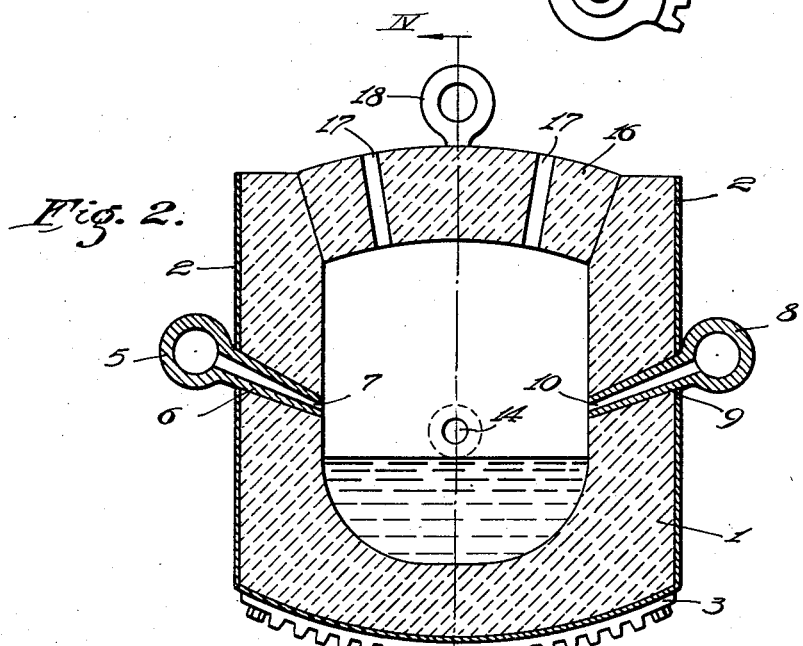
Fig. 2 is a view of the furnace in the upright or normal position.

When the furnace is in the normal or upright position, as shown in Fig. 2, and is properly charged, the hearth forms a container from which slag may be poured through a slag hole 14 located in one of the ends of the furnace and normally closed by a plug 15 (Fig. 4). The furnace is preferably provided with a cover 16 of the reverberatory type, which may be provided with openings 17 to permit the escape of excess gas and with an eye-bolt 18 for lifting the cover.

The steel is separated from the sulphurized slag formed in the first step and is transferred to the tilting furnace. A new, strongly basic, slag is formed by adding lime or an equivalent basic material, and the furnace is tilted into the position shown in Fig. 1. Air, oxygenated air or oxygen under pressure is forced through the tuyeres or nozzles 7 and the charge is blown until the carbon, manganese, silicon and phosphorus in the iron are oxidized and there is an excess of oxidized iron present. The oxidized manganese, silicon and phosphorus will combine with the slag and in this example, will be removed therewith, and the carbon will escape with the excess air as carbon-monoxide, or carbon-dioxide.

When the steel is completely oxidized, the furnace is returned to the upright position, slag is drawn off through slag-hole 14 and the charge is held for a short time in order to permit reaction between the carbon and iron oxide, and also to permit small slag particles to coalesce and to come to the surface of the metal.

The furnace is then tilted into the position shown in Fig. 3, and is blown with the reducing gas. As shown in the drawings, the walls of the furnace are sufficiently massive so that sufficient heat will be absorbed during the oxidation step to prevent the metal from congealing during the treatment with the reducing gas. For carbon-free alloys, I prefer to blow the charge with hydrogen until the oxides in the iron are reduced.

The furnace is next returned to the normal position, as shown in Fig. 2, and a small amount of reducing gas, or a non-oxidizing gas, is allowed to flow through pipe 8 into the furnace, in order to prevent reoxidation of the metal, or until the bath is freed from occluded oxides.

The metal treated by this process may be reduced to nearly pure iron, and with sufficient care, the impurities, particularly carbon, oxygen and sulphur, may be eliminated. The degree of purification of the iron will depend on the length of treatment and the care with which the several steps are carried out. With sufficient care, the iron may be made to closely approach the composition or purity of electrolytic iron.

The treatment of the iron with gases in the final steps operates mechanically as well as chemically in purifying the iron. For example, when the iron is blown with hydrogen, solid substances, such as free carbon, oxides of metals, and slag particles, will coalesce in the molten iron and will be removed by the force of the gas as it is blown through the nozzles 7 or 10.

While I have described a specific embodiment of my invention, various modifications thereof may be made without departing from the spirit and the scope of the invention. I desire, therefore, to be limited only by the prior art and in accordance with the scope of the invention, as defined in the annexed claims.

I claim as my invention:

1. The process of refining which consists in melting iron in a non-oxidizing atmosphere in the presence of basic reducing slag-forming materials for forming a sulphurous slag, removing the sulphurous slag, adding basic oxidizing slag-forming materials and passing air through the molten metal, removing the slag and then passing a reducing gas, consisting at least in part of hydrogen, through the melted iron.

2. The process of refining iron which consists in successively treating melted iron with basic slag, first in non-oxidizing and second in oxidizing conditions and removing the slag after each treatment, thereby removing non-ferrous impurities from said iron and creating oxide of iron in the metal and then blowing with hydrogen whereby oxides are reduced and non-metallic inclusions are removed.

3. The process of refining which comprises melting iron in the presence of basic, reducing slag-forming materials in a non-oxidizing atmosphere for removing the sulphur, removing the sulphurous slag, adding a basic oxidizing slag, passing an oxidizing gas through the metal, removing the oxidizing slag, and then passing a reducing gas through the molten iron.

4. The process of refining which comprises melting iron in the presence of basic reducing slag-forming materials in a reducing atmosphere for removing the sulphur, removing the sulphurous slag, adding a basic oxidizing agent, passing air through the metal, removing the oxidizing slag, and then passing a reducing gas through the molten iron.

5. In the process of refining iron, the steps which comprise melting the iron in the presence of a basic reducing slag in a non-oxidizing or reducing atmosphere for removing the sulphur, removing the slag and treating with a basic oxidizing slag in the presence of oxidizing gases for removing the carbon, phosphorus, silicon and manganese.

6. In the process of refining iron, the steps which comprise melting the iron in the presence of a basic reducing slag in a non-oxidizing or reducing atmosphere for removing the sulphur, removing the slag, adding a basic oxidizing slag and passing an oxidizing gas through the metal, thereby removing the carbon, phosphorus, silicon and manganese.

7. The process of refining which consists in melting iron with a basic reducing slag in a non-oxidizing or reducing atmosphere, removing the basic reducing slag treating under strongly basic and oxidizing conditions until there is an excess of oxide of iron in the metal and impurities are removed from the metal partly as a slag, removing the slag, and then reducing the iron oxide with a gas.

8. The process of refining which consists in melting iron in the presence of a basic reducing slag in a non-oxidizing or reducing atmosphere, removing the slag, treating with a basic oxidizing slag in the presence of oxidizing gases, removing the basic oxidizing slag and then passing a reducing gas through the melted iron.

9. The process of refining which consists in melting iron in the presence of a basic reducing slag in a non-oxidizing or reducing atmosphere, removing the slag, treating with a basic oxidizing slag in the presence of oxidizing gases, removing the basic oxidizing slag and then passing a reducing gas consisting in part of hydrogen through the melted iron.

10. The process of refining which consists in melting iron in the presence of a basic reducing slag in a non-oxidizing or reducing atmosphere, removing the slag, treating with a basic oxidizing slag in the presence of oxidizing gases, removing the basic oxidizing slag and then passing hydrogen through the melted iron.

11. The process of refining which consists in melting iron in the presence of a basic reducing slag in a non-oxidizing or reducing atmosphere, removing the slag, treating with a basic oxidizing slag in the presence of oxidizing gases, removing the basic oxidizing slag and then passing a hydrocarbon gas through the melted iron.

12. The process of refining which consists in melting iron in a non-oxidizing atmosphere in the presence of basic reducing slag-forming materials for removing the sulphur, removing the slag, adding a basic oxidizing slag and passing an oxidizing gas through the molten metal, removing the oxidizing slag and then passing a reducing gas through the melted iron.

13. The process of refining which consists in melting iron in a non-oxidizing atmosphere in the presence of basic reducing slag-forming materials for forming a sulphurous slag, removing the sulphurous slag, adding basic oxidizing slag-forming materials and passing an oxygen-yielding gaseous body through the molten metal, removing the slag and then passing a reducing gas consisting of hydrogen through the melted iron.

14. The process of refining which consists in melting iron in a non-oxidizing atmosphere in the presence of basic reducing slag-forming materials for forming a sulphurous slag, removing the sulphurous slag, adding basic oxidizing slag-forming materials and passing air through the molten iron, removing the slag and then passing a gas consisting of hydrogen through the melted iron.

ALBERT A. FREY.